Oct. 29, 1968  V. GUIDI ETAL  3,407,703
MACHINE TOOL FOR BACK WORKING OF BORE HOLES
Filed Nov. 7, 1966
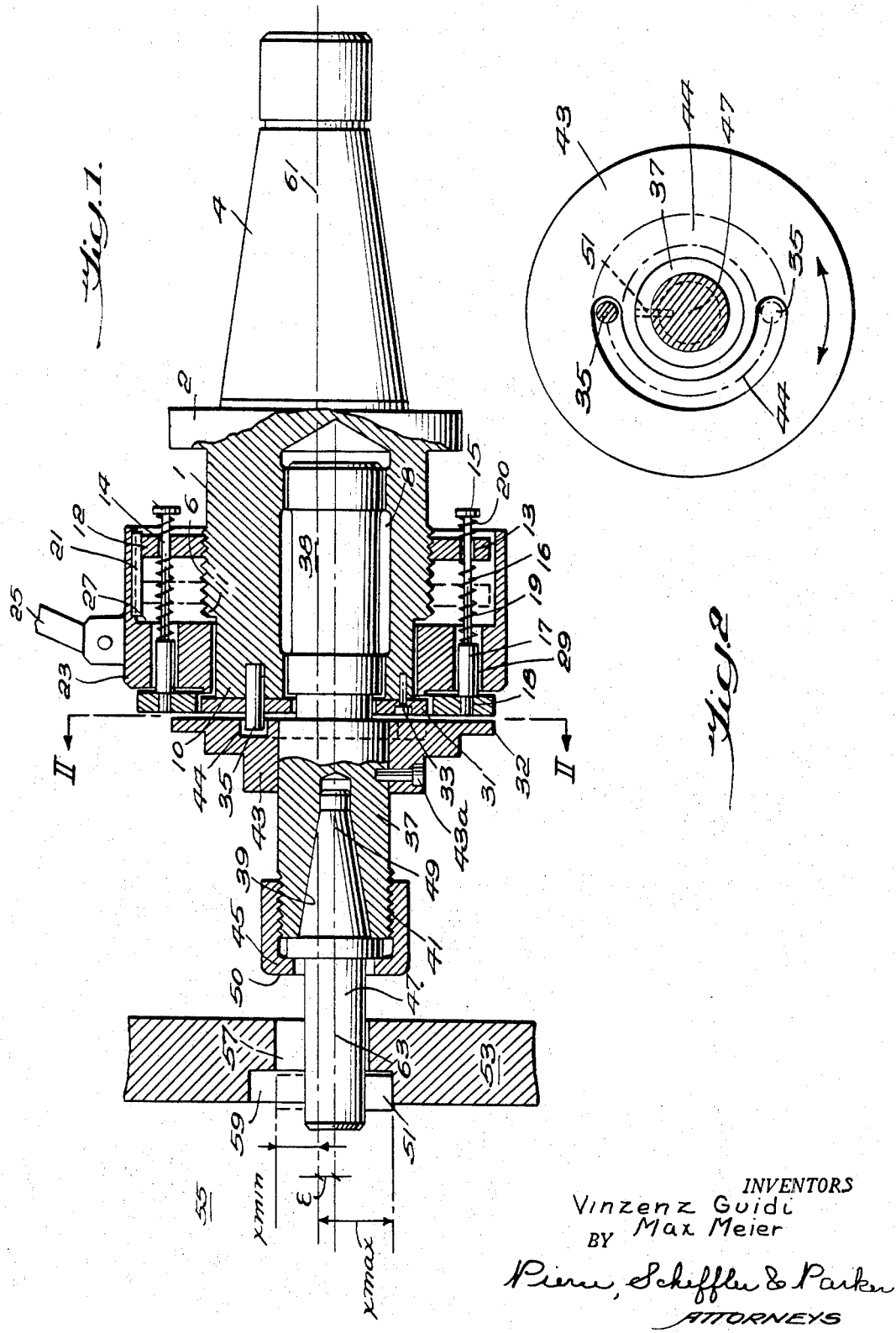
INVENTORS
Vinzenz Guidi
Max Meier
BY
Pierce, Scheffler & Parker
ATTORNEYS United States Patent Office 3,407,703
Patented Oct. 29, 1968

3,407,703
MACHINE TOOL FOR BACK WORKING OF BORE HOLES
Vinzenz Guidi, Baden, and Max Meier, Wettingen, Switzerland, assignors to Aktiengesellschaft Brown, Boveri & Cie, Baden, Switzerland, a joint-stock company
Filed Nov. 7, 1966, Ser. No. 592,590
Claims priority, application Switzerland, Dec. 15, 1965, 15,752/65
7 Claims. (Cl. 90—11)

This invention relates to machine tools and more particularly to an improved tool arrangement for effecting a back-milling or back-countersinking of bore holes.

Back-milling or back countersinking of bored holes is understood to be the process by which a tool holder must be introduced through the bore from one side of a wall and the "back" machining must be done at the other and perhaps non-accessible side of the wall, as happens especially when bored holes of housings are back-milled or countersunk. Such back-countersinking or back-milling operations are normally executed by means of boring tools and insertable cutters, or by means of special countersinks, from the outside. The countersinking or milling of a face of a bored hole inside a housing requires an additional aid which performs the tool change within this space for first retracting the tool which bored the hole, and after the latter has been extended again, for the countersinking operation. Such a tool change requires operating space, is expensive and, in numerically controlled machines, hinders a numerical control of this machining operation. The introduction of automatic machining cycles, for example, in punched hole tape-controlled machine tools, demands a much more comprehensive treatment of the tool change than in regular machines. The interest in any tape-controlled operation is lost when the cycle has to be interrupted in order to insert and take out again back-milling cutters manually, as has heretofore been necessary.

There is a further possibility in that, using a boring head, the milling cutter is moved radially to the tool spindle after it has been extended into the bored hole and, after completion of the machining operation, is moved back and retracted from the bored hole with the boring head. However, this method is complicated and time-consuming.

A principal object of this invention is to circumvent these disadvantages. In accordance with this object, the improved back-boring tooling arrangement is characterized by a tool supporting arrangement wherein the tool which does the back boring can be shifted automatically, depending upon the sense of rotation of the driving means, from a rest position of minimum eccentricity in which the tool can be inserted into or retracted from the bore hole required to be back bored to a working position of maximum eccentricity, relative to the axis of rotation of the driving means.

One suitable embodiment of the invention will be hereinafter described in conjunction with the accompanying drawings wherein:

FIG. 1 is a side view partly in elevation and partly in central longitudinal section of the device for back-boring of bored holes, with tool holder and inserted cutter; and FIG. 2 is a transverse section taken on the line II—II of FIG. 1.

With reference now to the drawings, the improved tooling comprises a work spindle structure that includes a cylindrical housing 1 provided with an intermediate flange 2 and a cone center 4 for chucking into the customary rotary drive means for the spindle. A central part of the external surface of the housing is threaded at 6 and it also includes an internal bore 8 which is located eccentrically to the longitudinal axis 61 of the housing 1 and its cone center 4. The opposite end portion 10 of housing 1 onto the end surface of which the eccentric bore 8 opens is reduced in diameter to establish a shoulder 11. An annular nut 12 with internal threading is threaded onto the externally threaded part 6 of housing 1, and extending through circumferentially spaced holes 13 in nut 12 are a plurality of pins 14. These pins are headed at one end at 15 and their opposite ends 18 are threaded for a screw fixing engagement in threaded holes in a brake ring 30 to be later explained. The annular nut 12 is restrained from rotation relative to housing 1 by means of a guiding and locking key 21 which is received in aligned slots in the nut 12 and in an inner wall of a bell-shaped sleeve 23, but this key connection permits an axial displacement of the nut 12 on housing 1 as the latter is rotated, the direction of the displacement depending, of course, on the direction of rotation of the housing. The keyed connection between sleeve 23 and nut 12 also assures freedom of relative axial movement between the pins 14 and nut 12.

When nut 12 occupies its extreme right position as depicted in FIG. 1, helical springs 20 located on the pins 14 between one face of nut 12 and the pin heads 15 will be compressed. Also located on an intermediate shank portions 16 of each pin 14 is another helical compression spring 19, one end of the latter being engageable with the opposite face of nut 12 and the other end thereof bearing against an enlarged pin part 17 which passes through holes 29 in sleeve 23 and serves to guide the pins.

Sleeve 23 is restricted against axial displacement by shoulder 11 and by a combined locking and holding ring 31 which is secured to the end face of housing 1 by means of a plurality of circumferentially spaced cap screws 33 and is located radially inward of the braking ring 30. Associated with sleeve 23 is also a holder 25 which prevents it from rotating, and the interior of this sleeve provides accommodation for the control elements e.g. pins 14, etc. of the device.

A driving pin 35 which is press-fitted into the end face of housing 1 passes through an opening in the locking ring 31 and engages a semi-circular groove 44 provided in a driving flange 43, as seen in FIG. 2, the flange 43 surrounding a boring tool holder structure 27 and being made an integral part thereof by means of a set screw 43a. The driving pin 35 which rotates with housing 1 in association with the semicircular groove 44 in flange 43 secured to the tool holder 37 thus permits of 180° relative rotation as between the housing 1 and tool holder 37.

Tool holder 37 is provided with a cylindrical shaft part 38 at one end which is inserted into the eccentric bore 8 in housing 1. At its opposite end, tool holder 37 is provided with a conical bore 39 and an externally threaded end 41. This serves to permit attachment of the back-boring tool or cutter which includes a cone center 49 insertable in the conical bore 39, a flange 50 against which is pressed a cap nut 45 screwed onto the threaded end part 41 thus to hold the cone center in place, and a stem part 47 in which is inserted at the outer end thereof the actual back-boring, or back-countersinking cutter element per se, this being denoted by numeral 51, The casing wall part to be back-worked, i.e. from its inner side is indicated at 53, and it includes a bore 57 through which the stem part 47 of the tool passes to the interior 55 of the casing.

It will be noted from FIG. 1 that the axis 63 of tool holder 37 is radially offset from the axis 61 of the work spindle (housing 1 and cone center 4) by the distance $\epsilon$. The radially outer edge of the back-milling cutter 51 can thus be varied between a minimum value ($x_{min}$) and a maximum value ($x_{max}$) by rotation of the tool holder 37 through an angle of 180°. As has been explained, tool holder 37 can be rotated within housing 1 by 180°, this being made possible through the 180° movement which is permissible between driving pin 35 (secured to housing 1) and the semi-circular groove 44 which is an integral part of the tool holder structure 37.

The improved back-boring or back-countersinking operation, as the case may be, is performed in the following manner.

The work spindle part, i.e. housing 1 and cone center 4, is rotated by any suitable rotative driving means, not shown, about the axis 61. In order to introduce the cutter 51 through bore 57 in the casing wall 53, groove 44 is given a position indicated by the dash-dot outline indicated in FIG. 2 into which tool holder 37 is brought by rotating it in a counter-clockwise direction. In this position the radial offset ($x_{min}$) is attained, i.e. the radial offset as between the tool holder axis 63 and the axis 61 of the work spindle is a minimum and this permits the stem 47 with the cutter 51 to be inserted through the bore 57 with the cutter 51 in the position indicated in dash-dot outline, the stem part 47 being much smaller in diameter than bore 57.

Now, when the work spindle (housing 1 and cone center 4) are turned in a clockwise direction, nut 12, guided by key 21 will shift axially from its left position shown in dash-dot outline to the right to its full line position, i.e. in a direction away from wall part 35 thus releasing the compression force which it had previously exerted on springs 19 and thus effecting disengagement between one face of brake ring 30 and the annular surface part 32 of the driving flange 43 against which it had previously been pressed.

In its extreme outer position, as well as in its extreme inner position, as determined by the direction in which nut 12 has run longitudinally on thread 6, the work spindle can turn without shifting nut 12 longitudinally. In the extreme outer position, nut 12 draws brake ring 30 by pins 14 against sleeve 23. During this process, the work spindle with housing 1 and drive pin 35 turns with respect to the still-braked tool holder 37 until pin 35 runs against the opposite end of groove 44. At that moment, brake ring 30 must be lifted off the braking surface 32 because now both the work spindle and tool holder are in foreclosing connection through the drive pin 35. Drive flange 43 including tool holder 37 finds itself with respect to the axis 61 in the position of maximum eccentricity ($x_{max}$) which then corresponds to the working position of cutter 51 in milling out the back-bore 59.

After the back-boring operation has been performed to establish the desired back-bore or countersink 59 from the inner side of casing wall 53, the ratation sense of the work spindle is reversed, i.e. switched to a counter-clockwise rotation, (FIG. 2) whereupon nut 12 will now run from right to left towards its other terminal position indicated in dash-out outline, thus compensating springs 19 and thus causing the brake ring 30 to be pressed against surface 32 of drive flange 43. The latter is then caused to be braked, and drive pin 35 will then move counter-clockwise in groove 44 until it positions itself at the other end of the groove, in which position cutter 51 will then have been shifted radially inward to its position of minimum eccentricity ($x_{min}$) relative to axis 61. Rotation of the work spindle part (housing 1 and cone center 4) is then stopped and the cutter 51 can then be retracted through bore 57 in the casing wall. In this manner the cutter tool 51 can be extended— or retracted—as the case may be within four to five revolutions of the work spindle to the left. With right hand rotation, the device functions for back boring. The improved device in accordance with the invention can be utilized over a very large working range which is determined by the amount of the eccentricity as between the cutter tool holder and driving spindle.

Moreover, the device permits adaptation to fully automatic, numerically controlled performance of the back-milling or back-countersinking operation for use in mass production and also in narrow interior spaces.

We claim:

1. In a machine tool for the back-working of bore holes, the combination comprising a work spindle having chucking means at one end thereof to effect rotation of the spindle and a cylindrical housing part, said housing part including a bore at one end thereof eccentric to the axis of rotation of said spindle, a tool holder having a shaft portion at one end received in said eccentric bore, a boring tool secured to the other end of said tool holder, circumferentially spaced stop means cooperative with said housing and tool holder for effecting a limited rotational displacement of said tool holder in said bore in one direction or the other to two limit positions relative to said housing dependent upon the sense of rotation of said work spindle, said stop means also providing a rotary driving connection between said housing and tool holder, and a back working tool mounted on said tool holder, the axis of said tool holder and hence also of said back working tool having a minimum eccentricity relative to the axis of rotation of said work spindle when said tool holder is rotationally displaced in one direction to one of said limit positions and having a maximum eccentricity when said tool holder is rotationally displaced in the opposite direction to the other of said limit positions.

2. A machine tool as defined in claim 1 and which further includes braking means actuated by rotation of said housing to apply a braking force to said tool holder when said housing rotates in one direction and to release said braking force when said housing rotates in the opposite direction.

3. A machine tool as defined in claim 2 wherein actuation of said braking means is effected by means of a nut threaded onto said housing, means preventing relative rotation as between said nut and housing but permitting axial travel thereof in one direction or the other dependent upon the direction of rotation of said housing, and pin means actuated by said nut and which are secured to said braking means.

4. A machine tool as defined in claim 1 wherein said spaced stop means are circumferentially spaced by 180°.

5. A machine tool as defined in claim 1 wherein said stop means includes a semi-circular groove element and a driving pin element engaged in said groove, said elements being carried respectively by said tool holder and housing.

6. In a machine tool for the back-working of bore holes, the combination comprising a work spindle having a center at one end thereof adapted to be chucked into a rotary driving means and a cylindrical housing at its opposite end, said cylindrical housing including an externally threaded portion and a bore extending inwardly from one end thereof and which is eccentric to the rotational axis of said work spindle, a non-rotational sleeve surrounding said threaded part of said housing, an annular traveling nut having internal threads engaged with the external threads on said housing, means common to said sleeve and nut for preventing said nut from rotating but permitting back and forth axial travel thereof as a result of rotation of said work spindle in one direction or the other, said nut being provided with a plurality of circumferentially spaced axially extending openings through which pins are inserted, said pins being passed through aligned openings in said sleeve and being secured at one end thereof to a brake ring, said brake ring being axially displaceable in one direction or the other dependent upon the direction of movement of said pins, and said pins being actuated axially in one direction or the other by axial travel of said nut in one direction or the other, a tool holder, said tool holder including a shaft part inserted in said eccentric bore in said housing for limited rotation therein, and a flange part having a side face thereof adapted to be contacted by a confronting face of said brake ring and having also a concentric semicircular groove in which is received a driving pin secured to and projecting from said housing, said tool holder further including a concentric bore for receiving a back boring tool, the axis of said tool holder and hence also of said back boring tool having a basic minimum eccentricity with respect to the axis of rotation of said work spindle established by the eccentricity of said bore in said housing and a maximum eccentricity established by a relative rotational displacement of 180° as between said semi-circular groove and said driving pin, said brake ring being actuated in opposite directions respectively to brake and unbrake said tool holder dependent upon the direction of rotation of said work spindle which determines the direction of axial displacement of said traveling nut and pins.

7. A machine tool as defined in claim 6 and which further includes helical spring means surrounding each of said brake ring actuating pins and against which said traveling nut is pressed thus compressing said springs and establishing a yieldable axial drive force from nut to pins to thereby actuate said brake ring.

References Cited

UNITED STATES PATENTS

| | | | |
|---|---|---|---|
| 1,547,108 | 7/1925 | Ellis | 77—58 |
| 3,146,641 | 9/1964 | Benjamin et al. | 77—58 |
| 3,254,548 | 6/1966 | Gersch | 77—58 |

GERALD A. DOST, *Primary Examiner.*